3,671,125
DEVICE FOR ALIGNING PREFABRICATED CIRCUIT WITH A PHOTOGRAPHIC PLATE TO MAKE PRINTED CIRCUITS
Anatoly Matveevich Lutchenkov, Ulitsa Opernaya 9b, kv. 1; Mikhail Petrovich Shekhodanov, Ulitsa Shirotnaya 7–8; Sergei Alexandrovich Siyanov, Ulitsa Gorlovskaya 7/9, kv. 62; Ivan Stepanovich Korovin, Ulitsa Radistov 8a, kv. 16; Nonna Alexandrovna Kholstova, Ulitsa Ulyanova 9, kv. 7; Valentina Nikolaevna Kreptseva, 1 Nagorny mikroraion 28–88; and Nina Petrovna Leskovskaya, Ulitsa Zayarskaya 18, kv. 8, all of Gorky, U.S.S.R.
Filed Nov. 13, 1970, Ser. No. 89,372
Int. Cl. G02b 7/00
U.S. Cl. 355—133                                      3 Claims

ABSTRACT OF THE DISCLOSURE

A device for aligning a prefabricated circuit with a photographic plate and exposing the plate to produce printed circuits and solid circuits, which comprises a microscope and a manipulator including a main micrometer mounted in a bushing and having at its one end a dial for setting the optimal value of the gap between the prefabricated circuit and the photographic plate, and terminating at its other end in a screw tip; the device is further provided with a mechanism for vertically moving the prefabricated circuit, fashioned as a rod with a flange, mounted in a movable sleeve, said movable sleeve also having a second flange on which the flange of the rod rests, the upper end of the rod having a support hub loosely mounted thereon and carrying a hemisphere which has a microscope table disposed thereon, the sleeve having a lever pivotally secured thereon, resting upon the rod and operatively connected with the pivot of the main micrometer screw, and the flange of the sleeve having a bushing of the main micrometer screw rigidly secured therein. The device provides a very accurate and precise alignment of a prefabricated circuit with a photographic plate, which alignment does not get disturbed during subsequent securing of the circuit and the photographic plates prior to exposure of the photographic plate.

The present invention relates to devices for aligning a prefabricated circuit with a photographic plate and exposing the plate, and can be used in electronics for manufacturing solid circuits.

Known in the art is a device for aligning a prefabricated circuit with a photographic plate and exposing the former, manufactured by the Japanese firm "Nippon Kodaku" and comprising an exposure unit and an aligning unit consisting of a microscope and a manipulator.

However, this device possesses a substantial disadvantage. In this device the working gap between the prefabricated circuit and the photographic plate is set with the aid of a feeler mechanism for vertically adjusting the prefabricated circuit, which renders it impossible to select a minimal allowable gap which is of the order of microns, i.e. the optimal gap for any particular group of prefabricated circuits. Furthermore, the gap alters when tightening the fixing bolts of the vertical adjusting mechanism, and, to check it, it is necessary to employ measuring instruments, e.g. a dial-type indicator.

It is an object of the present invention to eliminate the aforementioned disadvantages.

The main object of the present invention is to provide the optimal working gap between the prefabricated circuit and a photographic plate, with a high accuracy, as well as the preservation of the stability of the gap in the course of further operation.

This object is accomplished by a device for aligning a prefabricated circuit with a photographic plate, and exposing the device comprising an exposure unit, an aligning unit having a microscope and a manipulator, according to wherein the manipulator comprises a micrometer with a main screw disposed in a bushing, the screw having at its one end a dial for setting the optimal value of the gap between the prefabricated circuit and the photographic plate and terminating at its other end portion in a screw tip; the device also includes a mechanism for vertically moving the prefabricated circuit, fashioned as a rod with a flange, mounted so that it can displace in a movable sleeve also having a flange on which the flange of the rod rests, and the upper end of the rod has a support hub loosely mounted thereon and carrying a hemisphere with a microscope table disposed thereon, the sleeve having a lever pivotly secured thereon, resting upon the rod and operatively coupled with the pivot of the main micrometer screw, and the flange of the sleeve having the bushing of the main micrometer screw rigidly secured therein.

The following description of an exemplary embodiment of the present invention is given with reference to the accompanying drawings, in which.

Figure 1:
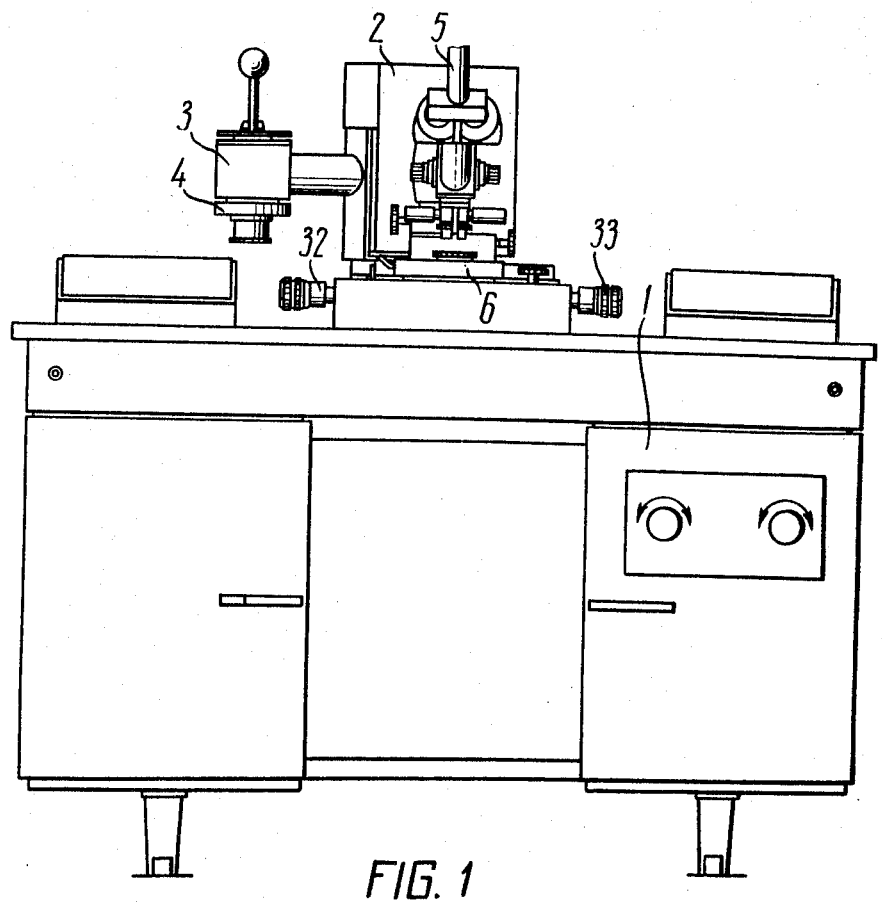
FIG. 1 shows a general view of a device for aligning a prefabricated circuit with a photographic plate and exposing the plate, according to the present invention.

The device for aligning a prefabricated circuit with that of a photographic plate and exposing the plate comprises a table 1 (FIG. 1) having disposed thereon an exposure unit consisting of a lamp 2, a reflector 3 and a shutter 4, and an aligning unit consisting of a microscope 5 and a manipulator 6.

The manipulator 6 is used for obtaining a precise optimal working gap between the prefabricated circuit and the photographic plate as well as for their rough and accurate alignment with respect to the angle of turning and accurate alignment along two axes X and Y.

Figure 2:
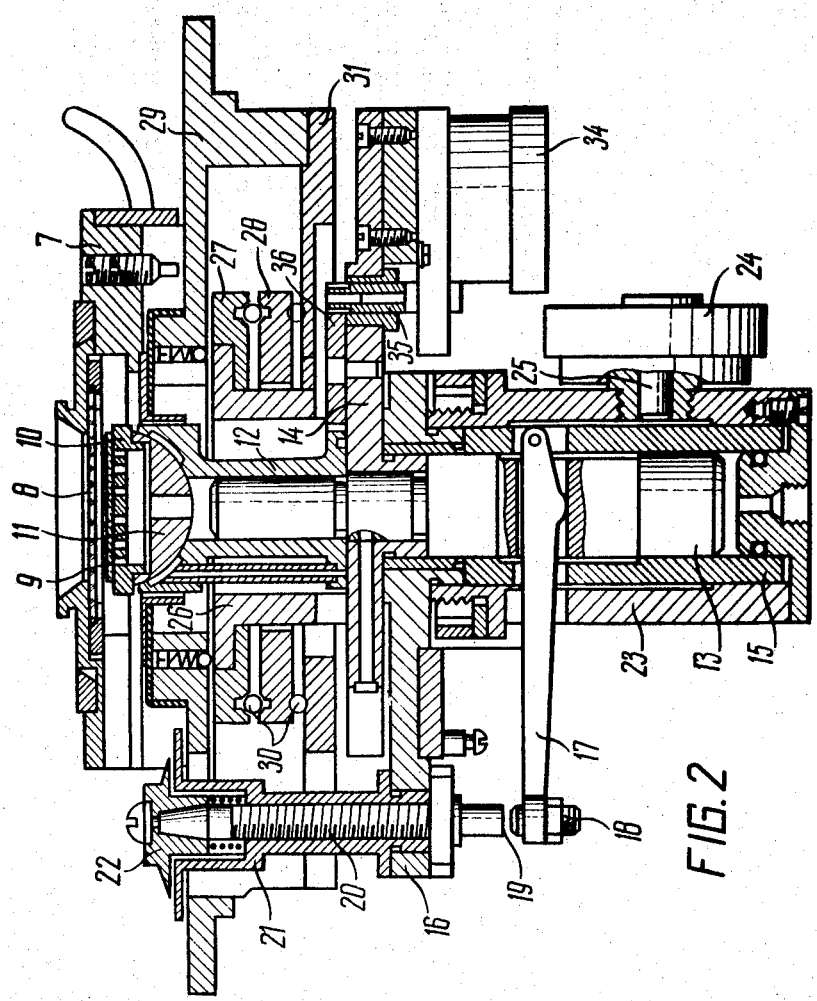
FIG. 2 shows a sectional view of the manipulator of an aligning unit according to the present invention.

Disposed on the manipulator 6 (FIG. 2) is a carriage 7 with a photographic plate 8, said carriage 7 being able to reciprocate which is necessary for placing a prefabricated circuit 9 onto a microscope table 10. The microscope table 10 is mounted on a hemisphere 11 which, in turn, rests upon a support hub 12 loosely fitted on the upper end of a rod 13 having a flange 14.

The rod 13 is mounted so that it can displace vertically and angularly in a movable sleeve 15 having a flange 16. The lower end of the rod 13 is provided with a horizontal slot accommodating a lever 17 which by its one end as pivotly secured in the movable sleeve 15 and by the other end carrying an adjusting screw 18 interacts with a pivot 19 of a main micrometer screw 20. The main micrometer screw 20 is mounted in a bushing 21 fixedly secured on the flange 16 of the movable sleeve 15.

The bushing 21 has an internal thread into which the main micrometer screw 20 is screwed. Besides, the main micrometer screw 20 is provided with a dial 22 having a graduation, and the bushing 21 is provided with a marking, said graduation and marking being used for setting the value of the working gap between the prefabricated circuit and the photographic pattern.

The movable sleeve 15 is disposed in a cylinder 23 so that it can move vertically in the latter. Disposed at a side of the cylinder 23 is a brake chamber 24 with a cylinder 25, said brake chamber 24 being used for rigidly fixing the movable sleeve 15 in its extreme upper position.

The cylinder 23 is secured on a hub 26 rigidly connected with a carriage 27. The carriage 27 and a carriage 28 are mounted in a body 29 and rest through ball bearings 30 upon a plate 31. The carriages 27 and 28 are acted upon by microscrews 32 and 33 (FIG. 1), which thereby effect a precise movement of the microscope table 10 (FIG. 2) along two axes X and Y.

To roughly adjust the microscope table 10 with respect to the angle of turning, provision is made for an electric motor 34 which is disposed on the flange 14 of the rod 13 and through a system of toothed wheels 35, 36 and a toothed wheel made integral with the support hub 12 can turn the microscope table 10 through any angle.

To effect a precise turning of the microscope table 10, provision is made for a hydraulic drive (not shown in the drawing), which, by acting upon the flange 14 of the rod 13, turns the latter together with the microscope table through a required angle (±15°).

The device functions as follows:

Prior to the device operation, a required value of the working gap between the prefabricated circuit 9 (FIG. 2) and the photographic pattern 8 is set by using the graduation of the dial 22 of the main micrometer screw 20 and a mark made on the upper butt face of the bushing 21.

Upon operating a "start" button on a control board, the lower space of the movable sleeve 15 is supplied, for example, with compressed air. Thereby, the rod 13, while moving upwards relative to the movable sleeve 15, turns the lever 17 and presses the latter by the adjusting screw 18 against the pivot 19 of the main micrometer screw 20. Then, the rod 13 continues moving upwards along with the movable sleeve 15 until the prefabricated circuit 9 is pressed against the photographic plate 8. At this moment compressed air is supplied into the brake chamber 24 which by means of the plunger 25 fixes the movable sleeve 15 in the upper position.

Thereupon, the lower space of the movable sleeve 15 is communicated with a vacuum line, and the rod 13 and the microscope table 10 move downwards over the value of the set working gap. As a result of this, the flanges 14 and 16 of the rod 13 and the movable sleeve 15 come in contact with each other, and the lever 17 occupies its initial position.

The control over the aligment process is carried out with the aid of the microscope 5 (FIG. 1). With a precise working gap set and the alignment completed, the microscope 5 that was disposed all this time in the zone of alignment is moved to the right, and its place is occupied by the exposure unit to expose the prefabricated circuit.

The exposure is carried out with the prefabricated circuit 9 pressed against the photographic plate 8, the time of the exposure being set automatically.

The device of the present invention is advantageous in that it makes it possible to obtain an optimal and stable value of the working gap between the prefabricated circuit and the photographic plate which, in turn, provides for a more qualitative alignment of the prefabricated circuit with that of the photographic plate and better visibility of the objects being aligned in the microscope, and, at the same time, excludes the possibility of breaking the integrity of the circuit drawing to be obtained from the photographic plate.

Besides, when using this device the efficiency of labour sharply increases due to the simplicity of setting the working gap.

We claim:

1. In a device for aligning and photographing a prefabricated circuit on a photographic plate to manufacture a printed circuit, of the type comprising a photographic exposure unit and an aligning unit having a microscope and a manipulator, the improvement comprising a manipulator which includes a micrometer having a graduated dial at one end of a main screw thereof, and having a screw tip at the other end of the main screw; a mechanism for moving a mounted prefabricated circuit near a mounted photographic plate, said mechanism comprising a vertically disposed sleeve and a rod movable therein, flanges provided on the sleeve and the rod one on each so that the flanges can abut each other; a support hub resting on an upper end of said rod supporting a hemispherical member on the top of which is disposed a microscope table; an elongated lever which is operatively associated with said rod near one end thereof and pivoted at said one end, and operatively associated in abutting relation at its other end with said screw tip; and means to actuate said rod in said sleeve.

2. The device as in claim 1, which further includes means to rotate said rod together with the microscope table, about the axis of the rod, said means to rotate comprising an electric motor.

3. The device as in claim 2, which further comprises a vertical cylinder in which said sleeve is movably arranged, and which includes means to arrest said sleeve in the cylinder at any desired position.

References Cited

UNITED STATES PATENTS

| | | | |
|---|---|---|---|
| 3,399,593 | 9/1968 | Delp | 95—12 |
| 3,492,072 | 1/1970 | Haun, Jr. | 356—162 UX |

SAMUEL S. MATTHEWS, Primary Examiner

M. L. GELLNER, Assistant Examiner

U.S. Cl. X.R.

95—12; 350—81, 86; 356—162, 172